Patented May 8, 1923.

1,454,593

UNITED STATES PATENT OFFICE.

EDWARD E. ARNOLD, OF COVENTRY, RHODE ISLAND, ASSIGNOR TO THE NITROGEN CORPORATION, OF PROVIDENCE, RHODE ISLAND, A CORPORATION OF RHODE ISLAND.

METHOD OF PURIFYING MINERAL OILS.

No Drawing.  Application filed February 24, 1921.  Serial No. 447,568.

*To all whom it may concern:*

Be it known that I, EDWARD E. ARNOLD, a citizen of the United States, residing at Coventry, in the county of Kent and State of Rhode Island, have invented certain new and useful Improvements in Methods of Purifying Mineral Oils, of which the following is a specification.

This invention relates to an improved process for purifying mineral oils, whereby the sulfur content of such oils may be removed and the commercial value of the oils thereby considerably enhanced.

One object of my invention is to accomplish the removal of the sulfur content by a simple and economical method.

Another object of the invention is to convert the sulfur contained in the oil into a by product of sufficient value to warrant its recovery and thus serve to reduce the cost of effecting the purification of the oil.

Other objects and advantages of the invention will be more fully set forth in the detailed description to follow.

Various crude mineral oils contain such a relatively large percentage of sulfur as to seriously affect their value for certain commercial purposes, and in separating such oils by fractional distillation it is found that large quantities of the sulfur are carried over into the various distillates thus rendering the distillates inferior for the usual commercial purposes.

The process herein described may be utilized for the purpose of removing the undesirable sulfur content either from the crude oil or from the various distillates obtained therefrom, but for commercial reasons it may be particularly advantageously employed in connection either with crude oil or the heavier distillates such as cylinder and lubricating oil in which the presence of a large sulfur content is especially undesirable.

It has been proposed to effect the removal of the undesirable sulfur content from mineral oils by passing gaseous ammonia therethrough under pressure and at elevated temperatures to remove the sulfur principally as sulfuretted hydrogen, but this method of procedure is open to the objection that the quality of the oil is liable to be impaired by the heat to which it is subjected, and the ammonia gas is not brought into such intimate contact with all parts of the oil being treated as to effectively remove the sulfur. Moreover, the product of the reaction is of little commercial value as a by product.

Another objection to this method is that by reason of the nature of the hydrocarbons of which the oil is composed the requisite penetration of the mass or bulk of such compounds by a sulfur removing agent to enable such agent to come into intimate contact with all of the sulfur is extremely difficult notwithstanding the fact that ammonia and mineral oils are miscible.

In order, therefore, to accomplish the removal of the sulfur most effectively by the use of ammonia I propose to employ liquid anhydrous ammonia and to introduce the same into the oil to be treated under a pressure sufficient to maintain the anhydrous ammonia in liquid form, mixing the oil and ammonia thoroughly by agitating or otherwise acting upon the mass to bring the liquid anhydrous ammonia into intimate contact with all portions of the oil and thus insure thorough mingling of the said ammonia and sulfur with consequent complete or approximately complete removal of the sulfur.

Since the affinity of ammonia for sulfur is greatly enhanced by the presence of a suitable catalyst, I may introduce some catalytic material such as sodium, potassium, calcium, barium or other alkalinous metal or a suitable compound or salt of such metal into the mass, the presence of which will accelerate the reaction during the mixing of the materials. In order to oxidize the ammonium sulfid resulting from the reaction of the liquid anhydrous ammonia and the sulfur content of the oil I also propose to add a suitable oxidizing agent such for example as sodium cyanate.

While any other suitable oxidizing agent or agents may be employed as may be found desirable under the varied conditions arising in the practical working of the invention, such for example as oxygen gas, I prefer to employ sodium cyanate and may introduce the same in the form of briquets made up of carbon, iron, sodium cyanate and sodium carbonate.

The process is preferably carried out by introducing the oil to be treated together with the oxidizing agent employed into a specially constructed receptacle capable of withstanding considerable pressure and provided with agitating mechanism or otherwise equipped with suitable means for mixing the contents.

Liquid anhydrous ammonia is then introduced into the mass which is subjected to pressure sufficient to maintain the anhydrous ammonia in its liquid state at the temperature at which the process is carried out, and the oil and liquid anhydrous ammonia are then thoroughly mixed in the presence of the oxidizing agent to bring the ammonia into intimate contact with all parts of the oil.

The above described operation is effected at a comparatively low temperature and consequently a large proportion of the excess of anhydrous ammonia remaining after the purification of the oil will readily pass off as gas upon removal of the pressure with slight elevation of the temperature and may be recovered for further use. By low temperature I intend to designate such a temperature as will be sufficiently high to prevent the oil being treated from congealing, and at the same time I propose to employ a temperature sufficiently low to prevent injury or decomposition of the oil or the hydrocarbons of which it is composed and to permit the maintenance of the anhydrous ammonia in its liquid state by exerting requisite pressure upon the mass. The ammonium sulfate formed by the reaction of the ammonia and sulfur in the presence of an oxidizing agent may be readily removed by washing, separated from the wash waters and recovered for use as a by product.

The liquid anhydrous ammonia while soluble to some measure in the oil and miscible with the latter, is nevertheless very much more highly soluble in water and thus water may advantageously be used for washing the oil to remove traces of the ammonia remaining therein together with the ammonia sulfur compound, especially on account of the ease with which the oil may be separated from the water. The oil product obtained by the above described process may, of course, be further purified, if desired by washing with alkaline waters, or like washes.

The result of the above described process is a complete freeing of the oil or distillate from sulfur, without contamination by any deleterious residue as a consequence of the process.

Since the percentage of sulfur in any given quantity of oil may be readily determined, suitable measured quantities of ammonia and the oxidizing agent employed may be used to properly combine with the sulfur for the formation of ammonium sulfate, but it is to be understood that my invention is not confined to the use of the precise quantities of these substances necessary to react with the sulfur content of the oil as it may be found desirable under certain conditions to employ an excess either of the ammonia or oxidizing agent or both. While I have mentioned sodium cyanate as a suitable oxidizing agent for use in the above described process, it is to be understood that my invention is in no way limited to the use of this particular oxidizing agent, but that any known oxidizing material may be used as may be desirable under varying conditions of operation.

Having described my invention, what I claim is:

1. In a process for purifying mineral oil, the step which comprises treating a mass of said oil with liquid anhydrous ammonia in the presence of an alkalinous metal oxygen bearing compound which serves as an oxidizing agent thus causing the sulfur present in said oil to combine with said ammonia under oxidizing conditions to form an ammonia-sulfur-oxygen compound.

2. In a process for purifying mineral oil, the step which comprises treating a mass of said oil with liquid anhydrous ammonia under pressure and in the presence of an alkalinous metal oxygen bearing compound which serves as an oxidizing agent thus causing the sulfur present in said oil to combine with said ammonia under oxidizing conditions to form an ammonia-sulfur-oxygen compound.

3. In a process for purifying mineral oil, the step which comprises treating a mass of said oil with anhydrous ammonia at a low temperature and in the presence of an alkalinous metal oxygen bearing compound which serves as an oxidizing agent thus causing the sulfur present in said oil to combine with said ammonia under oxidizing conditions to form an ammonia-sulfur-oxygen compound.

4. The process of purifying mineral oil, which comprises treating a mass of said oil with anhydrous ammonia in the presence of an alkalinous metal oxygen bearing compound which serves as an oxidizing agent thus causing the sulfur present in said oil to combine with said ammonia under oxidizing conditions to form an ammonia-sulfur-oxygen compound and separating said compound from the oil.

5. The process of purifying mineral oil, which comprises thoroughly mixing a mass of said oil with liquid ammonia in the presence of an alkalinous metal oxygen bearing compound which serves as an oxidizing agent compound thus causing the sulfur present in said oil to combine with said ammonia under oxidizing conditions to form an ammonia-sulfur-oxygen compound, and separating said compound from said oil.

6. The process of purifying mineral oil, which comprises thoroughly mixing a mass of said oil with liquid ammonia under pressure and in the presence of an alkalinous metal oxygen bearing compound which serves as an oxidizing agent thus causing the sulfur present in said oil to combine with said ammonia under oxidizing conditions to form an ammonia-sulfur-oxygen compound, and separating said compound from said oil.

7. The process of purifying mineral oil, which comprises thoroughly mixing a mass of said oil with liquid ammonia at a low temperature and in the presence of an alkalinous metal oxygen bearing compound which serves as an oxidizing agent thus causing the sulfur present in said oil to combine with said ammonia under oxidizing conditions to form an ammonia-sulfur-oxygen compound, and separating said compound from said oil.

8. The process of purifying mineral oil, which comprises thoroughly mixing a mass of said oil with liquid ammonia under pressure and at a low temperature and in the presence of an alkalinous metal oxygen bearing compound which serves as an oxidizing agent thus causing the sulfur present in said oil to combine with said ammonia under oxidizing conditions to form an ammonia-sulfur-oxygen compound, and separating said compound from said oil.

9. In a process for purifying mineral oil, the step which comprises, treating a mass of said oil with liquid anhydrous ammonia in the presence of a catalyst and an alkalinous metal oxygen bearing compound which serves as an oxidizing agent, thus causing the sulfur present in said oil to combine with said ammonia under oxidizing conditions to form an ammonia-sulfur-oxygen compound.

10. In a process for purfying mineral oil, the step which comprises, treating a mass of said oil with liquid anhydrous ammonia under pressure and in the presence of a catalyst and an alkalinous metal oxygen bearing compound which serves as an oxidizing agent thus causing the sulfur present in said oil to combine with said ammonia under oxidizing conditions to form an ammonia-sulfur-oxygen compound.

11. In a process for purifying mineral oil, the step which comprises, treating a mass of said oil with anhydrous ammonia at a low temperature and in the presence of a catalyst and an alkalinous metal oxygen bearing compound which serves as an oxidizing agent, thus causing the sulfur present in said oil to combine with said ammonia under oxidizing conditions to form an ammonia-sulfur-oxygen compound.

In testimony whereof I have affixed my signature.

EDWARD E. ARNOLD.